(12) United States Patent
Sato et al.

(10) Patent No.: US 10,770,979 B2
(45) Date of Patent: Sep. 8, 2020

(54) LLC RESONANT CONVERTER

(71) Applicant: OMRON Corporation, Kyoto-shi, Kyoto (JP)

(72) Inventors: Mitsuru Sato, Kyoto (JP); Shingo Nagaoka, Kyoto (JP); Hiroyuki Onishi, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/482,718

(22) PCT Filed: Nov. 20, 2017

(86) PCT No.: PCT/JP2017/041705
§ 371 (c)(1),
(2) Date: Aug. 1, 2019

(87) PCT Pub. No.: WO2018/179576
PCT Pub. Date: Oct. 4, 2018

(65) Prior Publication Data
US 2020/0007044 A1 Jan. 2, 2020

(30) Foreign Application Priority Data
Mar. 31, 2017 (JP) ................... 2017-071185

(51) Int. Cl.
*H02M 3/335* (2006.01)
*H02M 1/08* (2006.01)
(Continued)

(52) U.S. Cl.
CPC ......... *H02M 3/33569* (2013.01); *H02M 1/08* (2013.01); *H02M 1/4208* (2013.01); *H02M 2001/0009* (2013.01)

(58) Field of Classification Search
CPC ............. H02M 3/335; H02M 3/33507; H02M 3/33523; H02M 3/3356;
(Continued)

(56) References Cited

U.S. PATENT DOCUMENTS 7,660,133 B1 * 2/2010 Hwang ............. H02M 3/33592
363/16
2008/0259647 A1 10/2008 Risseeuw
(Continued)

FOREIGN PATENT DOCUMENTS

JP 2002-354804 A 12/2002
JP 2009-514495 A 4/2009
(Continued)

OTHER PUBLICATIONS

English translation of the International Search Report("ISR") of PCT/JP2017/041705 dated Jan. 9 2018.
Written Opinion("WO") of PCT/JP2017/041705 dated Jan. 9, 2018.

*Primary Examiner* — Yemane Mehari
(74) *Attorney, Agent, or Firm* — Metrolex IP Law Group, PLLC (57) ABSTRACT

The LLC resonant converter includes a bridge circuit configured to receive a DC input voltage, an LLC resonant circuit connected to the bridge circuit, a transformer connected to the LLC resonant circuit, a rectifier circuit connected to the transformer and configured to send out a converted DC voltage, a resonant capacitor changeover circuit, a bridge circuit control section, and a resonant capacitor changeover control section. When the input voltage exceeds a changeover voltage, the operating frequency is raised higher than the resonance frequency, and thereafter the switch is turned off.

2 Claims, 11 Drawing Sheets

(51) Int. Cl.
*H02M 1/42* (2007.01)
*H02M 1/00* (2006.01)

(58) Field of Classification Search
CPC ...... H02M 2007/4815; H02M 3/33569; Y02B 70/1433; Y02B 70/1441
USPC .............................. 363/16, 17, 21.01–21.02
See application file for complete search history.

(56) References Cited

U.S. PATENT DOCUMENTS

| | | | | |
|---|---|---|---|---|
| 2010/0182803 | A1* | 7/2010 | Nan | H02M 3/33592 |
| | | | | 363/21.02 |
| 2011/0242868 | A1* | 10/2011 | Gray | H02M 7/537 |
| | | | | 363/131 |
| 2012/0026755 | A1* | 2/2012 | Wu | H02M 3/33592 |
| | | | | 363/17 |
| 2013/0194831 | A1* | 8/2013 | Hu | H02M 3/33507 |
| | | | | 363/21.01 |
| 2015/0124490 | A1* | 5/2015 | Sanuki | H02M 3/33546 |
| | | | | 363/17 |
| 2017/0054379 | A1* | 2/2017 | Nishikawa | H02M 1/088 |
| 2018/0191252 | A1* | 7/2018 | Bianco | H02M 3/33569 |

FOREIGN PATENT DOCUMENTS

| | | |
|---|---|---|
| JP | 2014-003764 A | 1/2014 |
| JP | 2015-177595 A | 10/2015 |
| WO | 2007/049220 A2 | 5/2007 |
| WO | 2007/049220 A3 | 3/2008 |

\* cited by examiner

LLC RESONANT CONVERTER

TECHNICAL FIELD

The present invention relates to a DC to DC converter (DC/DC converter) that converts one DC voltage level to another. The present invention particularly relates to change-over control of a resonant capacitor, based on an input voltage and using a switch, in an LLC resonant converter which is a typical circuit example of an isolated DC/DC converter.

BACKGROUND ART

Figure 5:
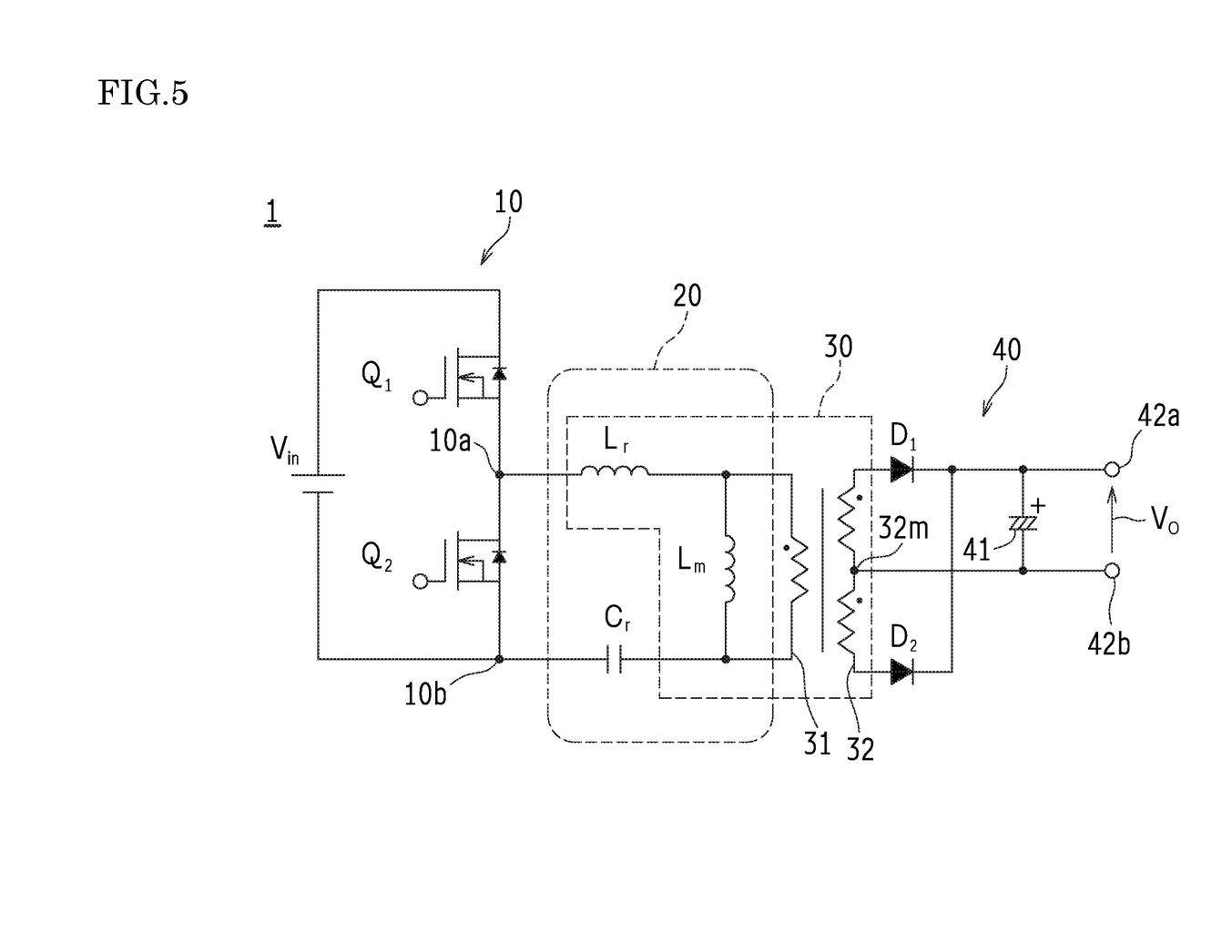
FIG. 5 is a circuit diagram representing a schematic configuration of an LLC current resonant converter 1, as an example of a conventional LLC resonant converter.

FIG. 5 is a circuit diagram representing a schematic configuration of an LLC current resonant converter 1, as an example of a conventional LLC resonant converter.

As shown in FIG. 5, the LLC current resonant converter 1 includes a bridge circuit 10 configured to receive a DC input voltage Vin, an LLC resonant circuit 20 connected to the bridge circuit 10, a transformer 30 connected to the LLC resonant circuit 20, and a rectifier circuit 40 connected to the transformer 30 and configured to send out a converted DC voltage.

The bridge circuit 10 has series-connected switches Q1, Q2. The states of these switches are changed in time sequence with predetermined timing. By such switching operations, the bridge circuit 10 sends out square-wave voltages at a connection point 10a between the switches Q1, Q2 and at a GND 10b.

The LLC resonant circuit 20 has a resonant capacitor Cr, an end of which is connected to the GND 10b of the bridge circuit 10. The resonant capacitor Cr, as well as a magnetizing inductance Lm and a leakage inductance Lr to be described later, forms the resonant circuit.

The transformer 30 includes a primary winding 31 and a secondary winding 32, which are isolated from each other. The magnetizing inductance Lm is connected in parallel to first and second ends of the primary winding 31. The leakage inductance Lr is connected in series to the first end of the primary winding 31. The first end of the primary winding 31 is connected to the connection point 10a of the switches Q1, Q2, via the leakage inductance Lr. The second end of the primary winding 31 is connected to the GND 10b of the bridge circuit 10, via the resonant capacitor Cr. The secondary winding 32 is provided with a center tap 32m.

The rectifier circuit 40 includes rectifier elements D1, D2 whose anodes (positive electrodes) are respectively connected to first and second ends of the secondary winding 32, a positive output terminal 42a connected to cathodes (negative electrodes) of the rectifier elements, a negative output terminal 42b connected to the center tap 32m of the secondary winding 32, a current smoothing capacitor 41 connected between the pair of output terminals 42a, 42b so as to smooth the electric current. Through this rectifier circuit, a DC output voltage Vo is generated at the pair of output terminals 42a, 42b.

This LLC current resonant converter 1 is an isolated DC/DC converter that can reduce a switching loss and noise that occur in the semiconductor devices on the primary side and the secondary side, by utilizing resonance of the single capacitance Cr and the two inductances Lm, Lr. Utilization of the leakage inductance Lr and the magnetizing inductance Lm of the transformer 30 reduces the number of elements required in the circuit configuration.

Figure 6:
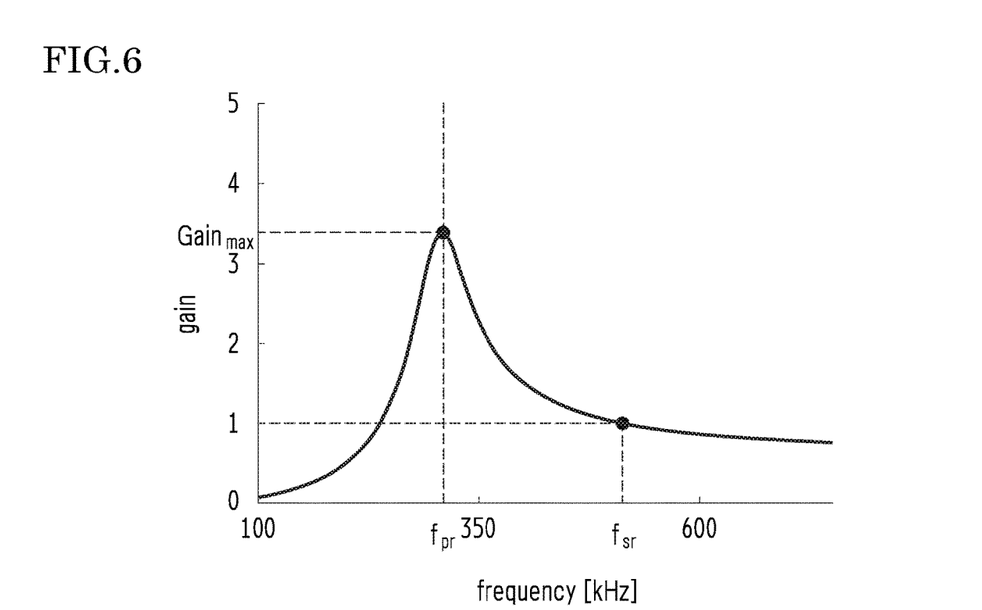
FIG. 6 is a graph showing an example of frequency-gain characteristics of the LLC current resonant converter 1.

FIG. 6 is a graph showing an example of frequency-gain characteristics of the LLC current resonant converter 1.

The LLC current resonant converter 1 converts an input voltage Vin to a desired output voltage Vo by PFM (pulse frequency modulation) at the switches Q1, Q2. The LLC current resonant converter 1 can control the gain (i.e., a conversion ratio of the output voltage Vo to the input voltage Vin) by changing the frequency in the PFM, and can thus obtain the desired output voltage Vo even when the input voltage Vin has changed. In the LLC current resonant converter 1 shown in FIG. 5, the output voltage and the input voltage have the following relationship:

output voltage $V_o$=(input voltage $V_{in}$×gain)/turns ratio N of the transformer where N is not necessarily an integer, and N may be 1 or greater, or less than 1. In FIG. 6, fsr represents the resonance frequency when the gain is 1, and fpr represents the resonance frequency when the gain is maximum, Gainmax.

As the range from Gainmax to Gain 1 is greater (the gain is higher), the LLC resonant converter can produce a desired output voltage Vo with a lower input voltage Vin.

Figure 7:
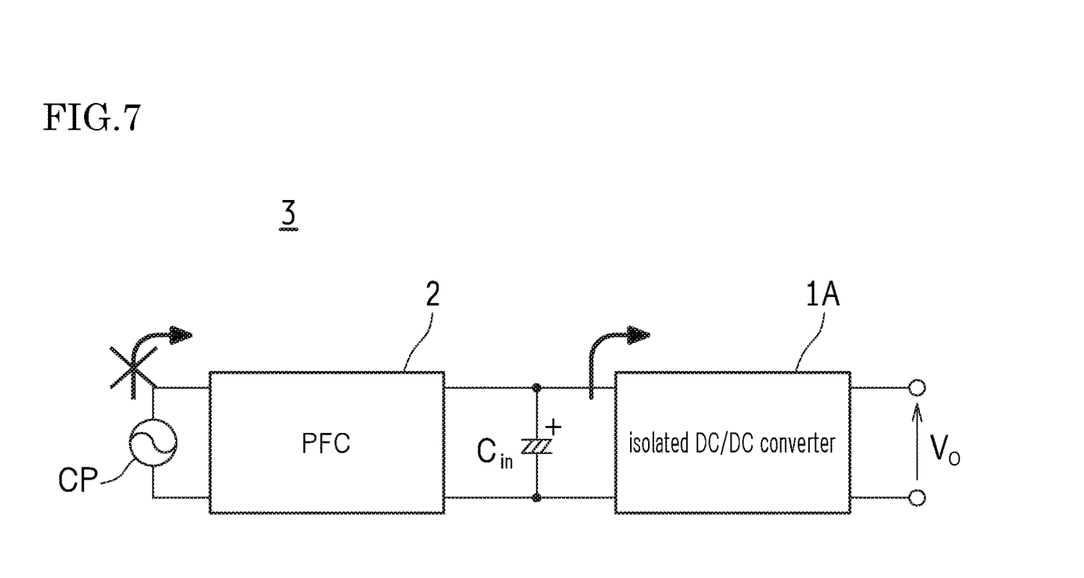
FIG. 7 is a schematic view showing a configuration example of a source circuit containing the LLC resonant converter.

FIG. 7 is a schematic view showing a configuration example of a source circuit containing the LLC resonant converter.

In the source circuit 3 shown in FIG. 7, an alternating-current commercial power CP is applied to an PFC (Power Factor Correction: power factor improvement circuit) 2. An isolated DC/DC converter 1A receives an output from the PFC 2, and produces a DC output voltage Vo. A block capacitor Cin connects two connecting lines between the PFC 2 and the isolated DC/DC converter 1A. The LLC current resonant converter 1 according to the present invention can serve as the isolated DC/DC converter 1A.

If power supply from the commercial power CP stops, the source circuit 3 should maintain the output voltage without any loss for a predetermined time (e.g., 20 ms, hereinafter called "retention time t"). During this time, power is supplied by the block capacitor Cin. The minimum capacitance Cinmin of the block capacitor Cin is obtained by the following formula.

$$C_{inmin} = \frac{2P}{V_{c\_start}^2 - V_{in\_min}^2} \times t \quad \text{[Math. 1]}$$

In this formula, P, Vc_start, and Vin_min are defined as below.

P: maximum output power of the isolated DC/DC converter

Vc_start: charging voltage in Cin at the moment when power supply stops

Vin_min: minimum input voltage at which the isolated DC/DC converter is operable As understood from this formula, the lower the minimum input voltage Vin_min, the smaller the minimum capacitance Cinmin. The minimum input voltage Vin_min can be reduced as the isolated DC/DC converter 1A has a higher gain. Hence, a high gain enables downsizing of the block capacitor Cin, while keeping the retention time t.

Figure 8:
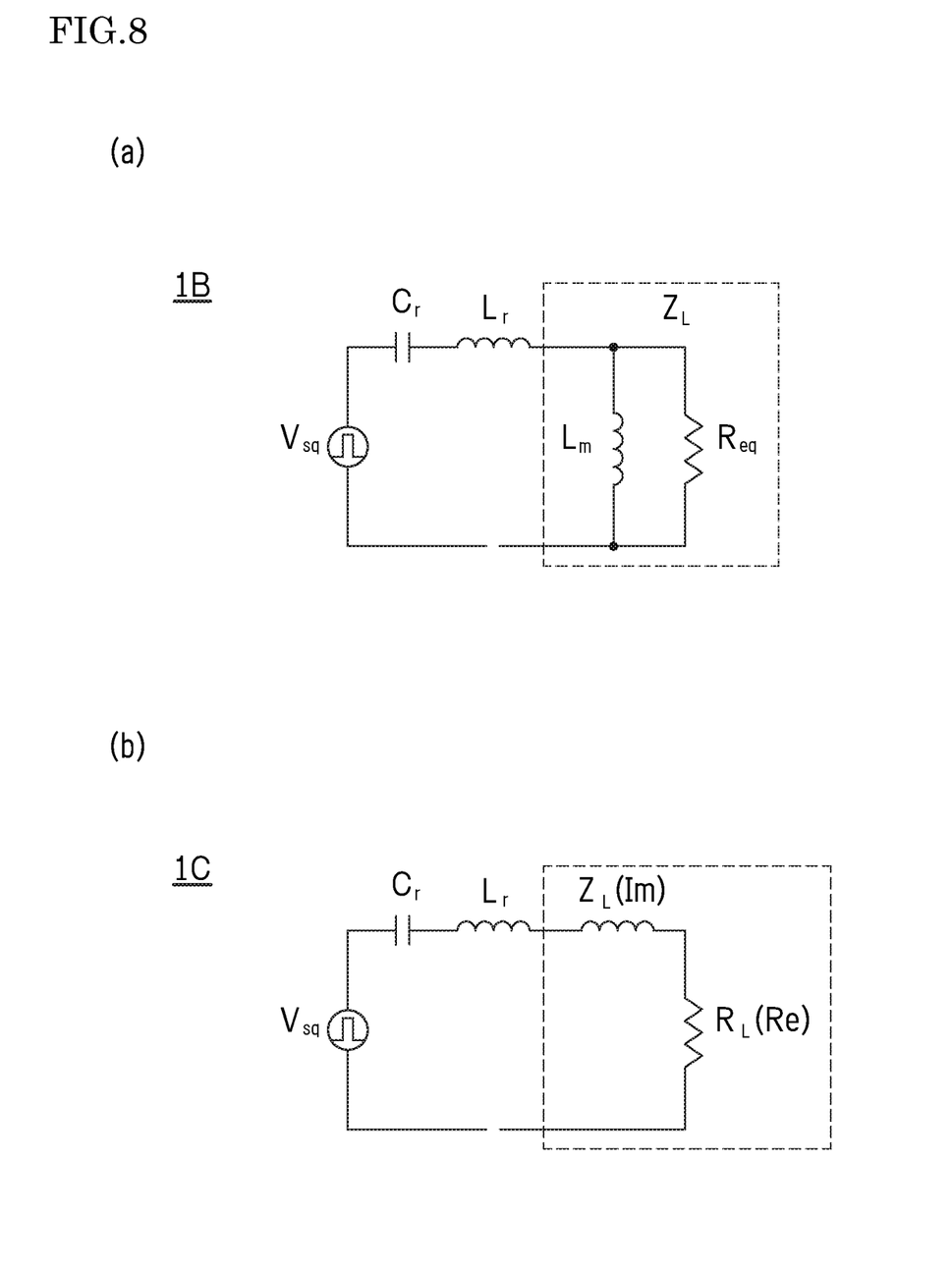
FIG. 8(a) shows an equivalent circuit in the LLC resonant converter including an output load resistance as a load, seen from the primary side of the transformer 30. ZL indicates a parallel connection part in FIG. 8(a).
FIG. 8(b) shows an equivalent circuit 1C in which a ZL inductance and a resistance are connected in series.

FIG. 8(a) shows an equivalent circuit 1B in the LLC resonant converter including an output load resistance as a load, seen from the primary side of the transformer 30. ZL indicates a parallel connection part in FIG. 8(a). FIG. 8(b) shows an equivalent circuit 1C in which a ZL inductance and a resistance are connected in series. In these circuits, Vsq represents an output voltage of the bridge circuit 10 as a square voltage source, and Req is obtained by the following formula in which the output load resistance on the secondary side of the transformer is converted to the AC resistance on the primary side.

In FIG. 8(b), ZL(Re) and ZL(Im) represent the real part and the imaginary part of ZL, respectively.

$$R_{eq} = \frac{8N^2 R_o}{\pi^2} = \frac{8L_m^2 N^2 R_o}{\pi^2 (L_m + L_r)^2}$$ [Math. 2]

In this formula, Ro represents an output load resistance, and N represents an actual turns ratio (primary:secondary) of the transformer.

The resonance frequency fsr is obtained by the following formula.

$$f_{sr} = \frac{1}{2\pi \sqrt{L_r C_r}}$$ [Math. 3]

The resonance frequency fpr is obtained by following formula, based on the equivalent circuit 1C of FIG. 8(b).

$$f_{pr} = \frac{1}{2\pi \sqrt{(L_r + Z_L(\text{Im}))C_r}} = \frac{1}{2\pi \sqrt{\left(L_r + \frac{L_m R_{eq}^2}{R_{eq}^2 + \omega^2 L_m^2}\right) C_r}},$$ [Math. 4]

$$\omega = 2\pi f_{pr}$$

Figure 9:
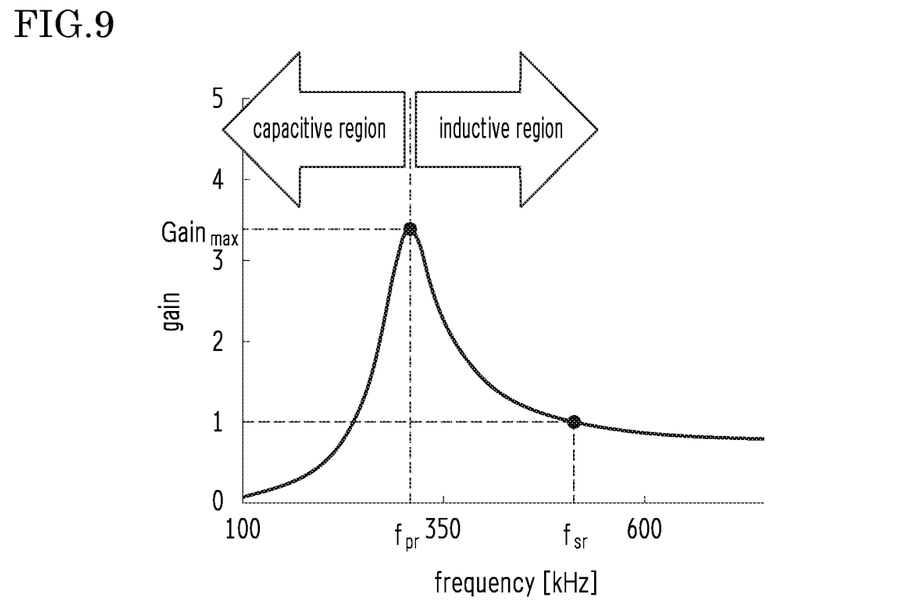
FIG. 9 is a graph showing an example of frequency-gain characteristics and two operating regions of the LLC resonant converter.

FIG. 9 is a graph showing an example of frequency-gain characteristics and two operating regions of the LLC resonant converter.

As shown in FIG. 9, the operation of the LLC resonant converter is divided into two operating regions at its resonance frequency fpr: a capacitive region (left) and an inductive region (right). In these regions, the LLC resonant converter operates with following features.

<Capacitive Region>
Hard switching (greater switching loss)
The higher the target gain, the higher the frequency.
A shoot-through current flows through the bridge circuit.
<Inductive Region>
Soft switching (less switching loss)
The higher the target gain, the lower the frequency.
No shoot-through current flows through the bridge circuit.

Namely, operation of the LLC resonant converter in the inductive region can reduce the switching loss in the high-frequency operation, and eventually the high-frequency operation enables downsizing of the transformer. For this advantage, the LLC resonant converter is usually controlled in the inductive region.

Figure 10:
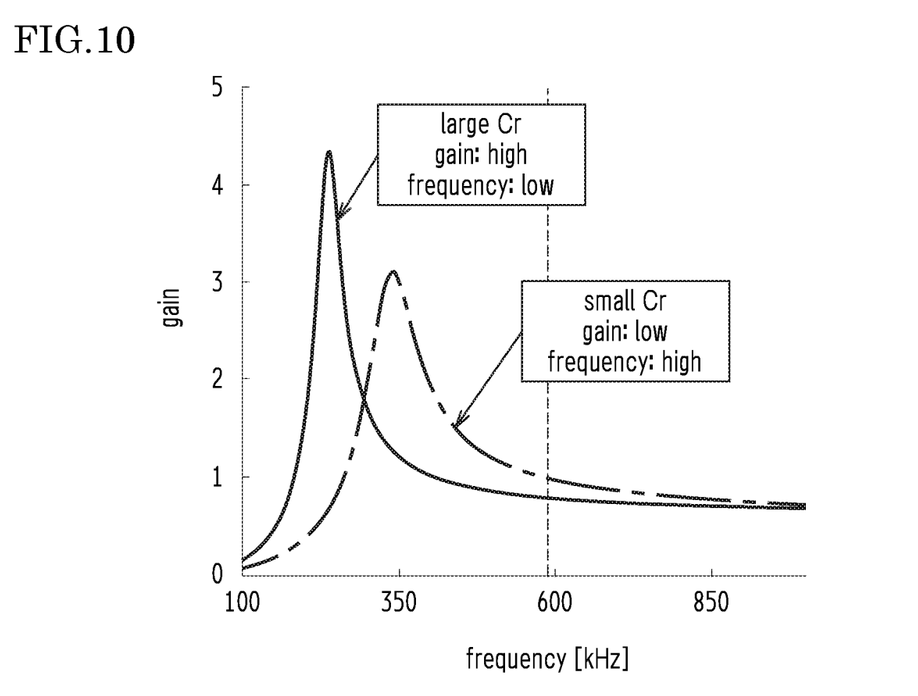
FIG. 10 is a graph showing an example of frequency-gain characteristics of the LLC resonant converter, with different resonant capacitors Cr.
Figure 11:
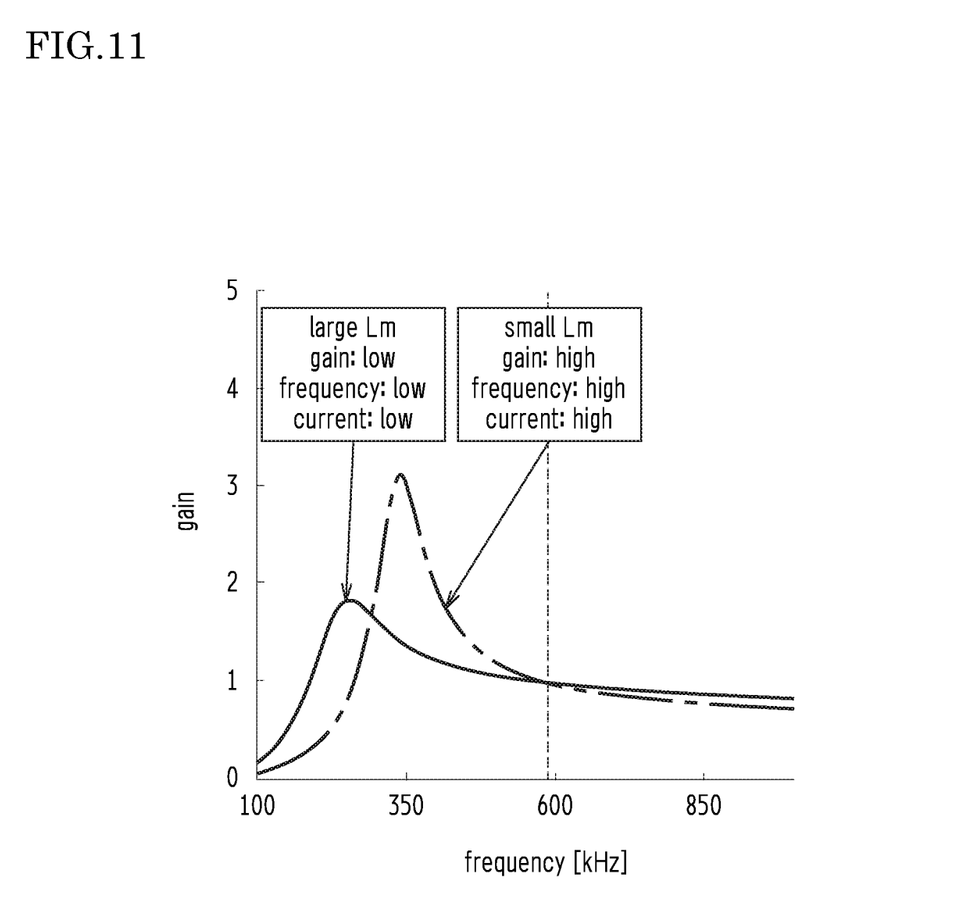
FIG. 11 is a graph showing an example of frequency-gain characteristics of the LLC resonant converter, with different magnetizing inductances Lm.

FIG. 10 is a graph showing an example of frequency-gain characteristics of the LLC resonant converter, with different resonant capacitors Cr. FIG. 11 is a graph showing an example of frequency-gain characteristics of the LLC resonant converter, with different magnetizing inductances Lm.

The magnetizing inductance Lm and the resonant capacitor Cr are designable parameters. A high gain is achieved either by a small Lm or a large Cr.

However, as indicated in FIG. 10 and FIG. 11, a small Lm allows conduction of a high current and results in a greater loss (deteriorates efficiency), and a large Cr lowers the operating frequency and obstructs downsizing of the transformer. On the other hand, a large Lm or a small Cr cannot realize a high gain. Thus, a high gain conflicts with a high-frequency and a high efficiency.

In a conventionally proposed manner for achieving a high gain and a high efficiency, an LLC resonant converter can change the capacitance of its resonant capacitor by turning on and off the switch Q3 in accordance with the input voltage Vin (see, for example, PTL 1).

Figure 12:
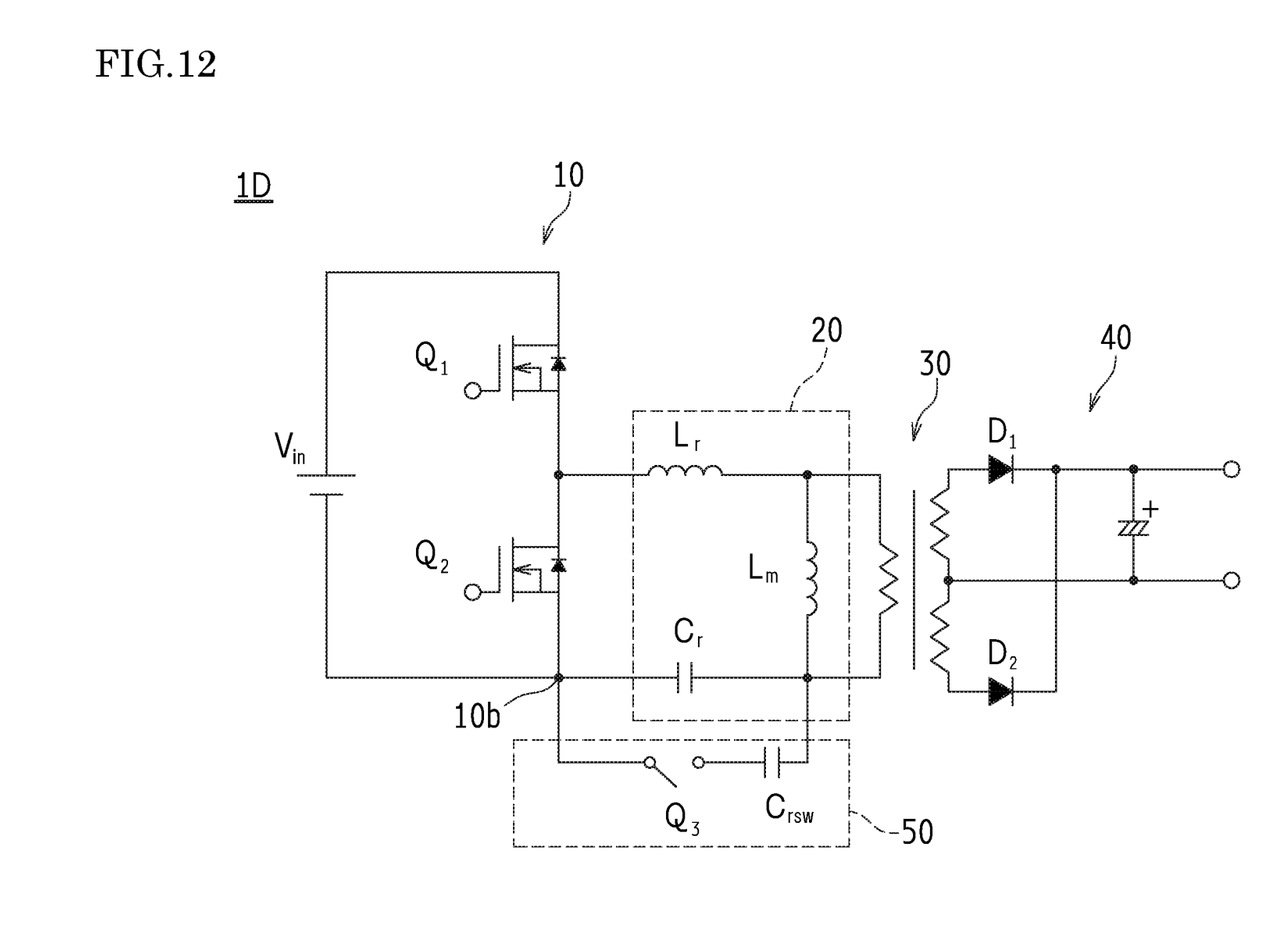
FIG. 12 is a circuit diagram showing a schematic configuration of an LLC resonant converter 1D that can change the capacitance of its resonant capacitor, similar to the power converter disclosed in PTL 1.
Figure 13:
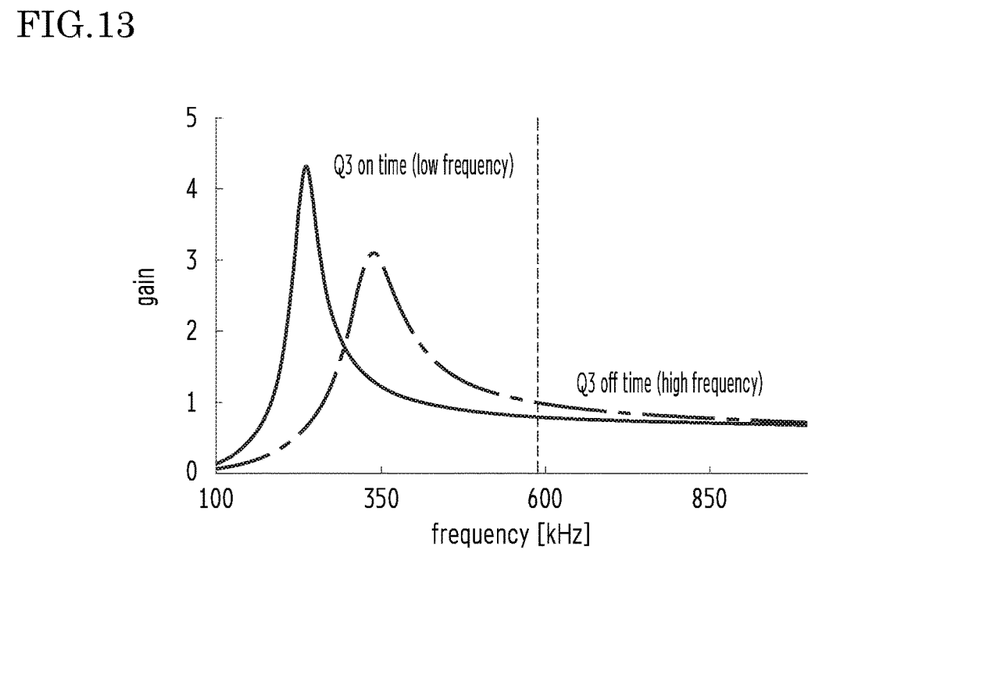
FIG. 13 is a graph showing an example of frequency-gain characteristics of the LLC resonant converter 1D.

FIG. 12 is a circuit diagram showing a schematic configuration of an LLC resonant converter 1D that can change the capacitance of its resonant capacitor, similar to the LLC resonant converter disclosed in PTL 1. FIG. 13 is a graph showing an example of frequency-gain characteristics of the LLC resonant converter 1D.

The LLC resonant converter 1D is distinguished from the LLC current resonant converter 1 shown in FIG. 5 by a resonant capacitor changeover circuit 50 in which the switch Q3 and a capacitor Crsw are connected in series. The resonant capacitor changeover circuit 50 is connected in parallel to the resonant capacitor Cr in the LLC resonant circuit 20.

In the steady state, as shown in FIG. 12, the switch Q3 is turned off, and the capacitor Crsw is disconnected from the LLC resonant circuit 20. The LLC resonant converter 1D operates with high-frequency characteristics, with the capacitance of the resonant capacitor Cr ("Q3 off time" in FIG. 13).

In contrast, when an input voltage Vin drops, the switch Q3 is turned on. The LLC resonant converter 1D operates with low-frequency characteristics, with the capacitances of the resonant capacitor Cr and the capacitor Crsw ("Q3 on time" in FIG. 13), thereby giving a high gain.

Later, when the input voltage Vin rises again, the switch Q3 is turned off, and the capacitor Crsw is disconnected from the LLC resonant circuit 20 again. The LLC resonant converter 1D operates, as before, with high-frequency characteristics, with the capacitance of the resonant capacitor Cr ("Q3 off time" in FIG. 13).

The LLC resonant converter 1D shown in FIG. 12, operating as described above, can be designed with a large magnetizing inductance Lm, so that a high-frequency, high-efficiency operation can be compatible with a high gain. For such compatibility, however, transition from the operation with low-frequency characteristics to the operation with high-frequency characteristics needs to be controlled properly.

Figure 14:
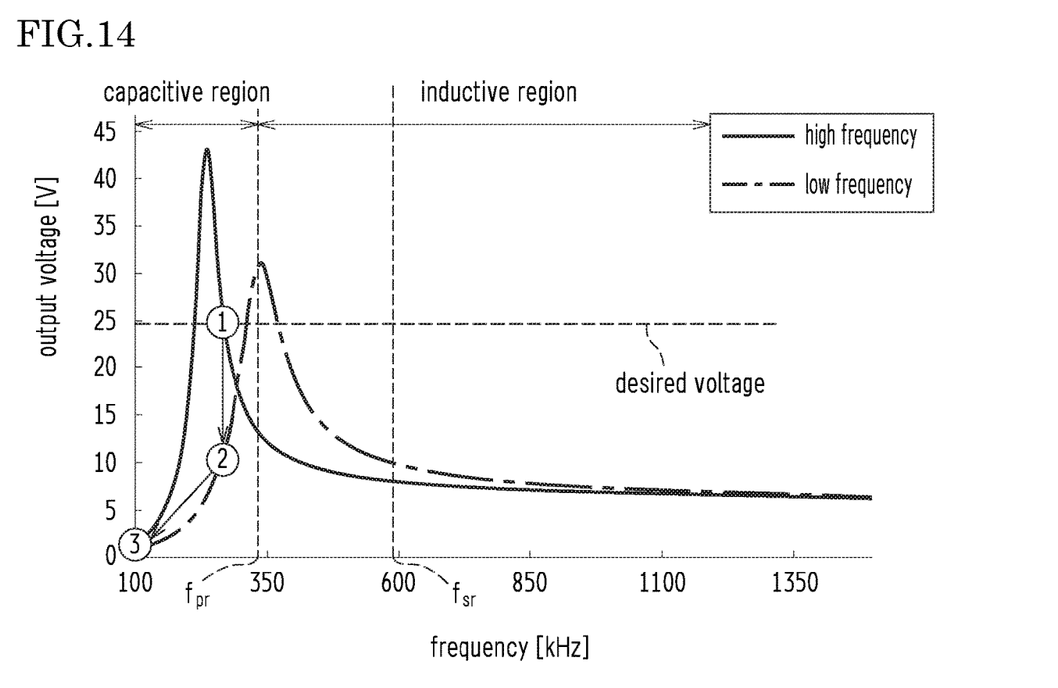
FIG. 14 is a graph for schematically describing an example of control in the LLC resonant converter 1D, during the transition from low-frequency characteristics to high-frequency characteristics.

FIG. 14 is a graph for schematically describing an example of control in the LLC resonant converter 1D, during the transition from low-frequency characteristics to high-frequency characteristics.

The LLC resonant converter disclosed in PTL 1, whose circuit configuration is similar to the one shown in FIG. 12, variably controls its power peak by turning on and off a switch M1 (corresponding to Q3 in FIG. 12).

The LLC resonant converter which controls the transition from low-frequency characteristics to high-frequency characteristics by reducing the capacitance of the resonant capacitor is configured "to turn off the changeover switch when the input voltage reaches a changeover voltage or when the operating frequency reaches the resonance frequency fpr". At the resonance frequency fpr, the gain reaches its peak with high-frequency characteristics. The resonance frequency fpr changes with a load.

However, this method causes two problems due to the transition from low-frequency characteristics to high-frequency characteristics.

Problem 1) The switches Q1, Q2 forming the bridge circuit are broken by a shoot-through current or a surge voltage.

Problem 2) The output voltage Vo is uncontrollable unless the control in the capacitive region is effective.

Problem 1) occurs when the LLC resonant converter operates in the capacitive region. Problem 2) occurs when the LLC resonant converter is controlled in a common manner in the inductive region.

Problem 2) is described more specifically. When the changeover switch is turned off (from Point 1 to Point 2 in FIG. 14) and the operating frequency remains unchanged, the operation with high-frequency characteristics gives a lower gain. Hence, the output voltage Vo, obtained by multiplying the input voltage Vin with the gain, falls to and below the desired voltage. Under normal control, which targets the inductive region, the operating frequency is lowered to obtain the desired output voltage Vo (from Point 2 to Point 3 in FIG. 14). Such control reduces the gain further, and makes the output voltage Vo even lower.

CITATION LIST

Patent Literature

[PTL 1] JP 2009-514495 A

SUMMARY OF INVENTION

Technical Problem

In view of these problems in the conventional technology, the present invention aims to provide an LLC resonant converter that can prevent breakdown of switches in the bridge circuit due to a shoot-through current or a surge voltage and that can avoid loss of control over the output voltage when the capacitance of the resonant capacitor is changed.

Solution to Problem

In order to achieve the above object, the LLC resonant converter according to the present invention has a bridge circuit configured to receive a DC input voltage and to send out a square-wave voltage by a switching operation of a switching element; an LLC resonant circuit having at least a first capacitor and configured to resonate on receiving the square-wave voltage; a transformer having a primary side connected to the LLC resonant circuit and a secondary side isolated from the primary side; a rectifier element configured to convert an output from the secondary side of the transformer into a DC output voltage; a smoothing capacitor configured to smooth the output voltage from the rectifier element; a resonant capacitor changeover circuit having a changeover switch and a second capacitor that are connected in series to each other and connected in parallel to the first capacitor; an input voltage detection circuit configured to detect the input voltage; an output voltage detection circuit configured to detect the output voltage; an output current detection circuit configured to detect an output current fed to a load; a resonant capacitor changeover control section configured to control a state of the changeover switch in the resonant capacitor changeover circuit, based on at least one of the input voltage detected by the input voltage detection circuit, the output voltage detected by the output voltage detection circuit, and the output current detected by the output current detection circuit; and a bridge circuit control section configured to control the switching operation of the switching element by pulse frequency modulation, and to control an operating frequency of the switching element such that the detected output voltage reaches a desired voltage or in response to a command from the resonant capacitor changeover control section. The resonant capacitor changeover control section is configured to turn on the changeover switch when the detected input voltage gets lower than a predetermined changeover voltage; and to send a command to the bridge circuit control section to raise the operating frequency to the changeover frequency when the detected input voltage exceeds the changeover voltage, and thereafter to turn off the changeover switch. The changeover frequency is higher than a first resonance frequency at which a gain of the LLC resonant circuit is maximum while the changeover switch is off, the first resonance frequency being obtained from the detected output voltage and the detected output current.

The resonant capacitor changeover control section may be further configured: when the detected input voltage exceeds the changeover voltage, to send a command to the bridge circuit control section to suspend control of the operating frequency for bringing the detected output voltage to the desired voltage and to raise the operating frequency to the changeover frequency; then, to turn off the changeover switch; and thereafter, to send a command to the bridge circuit control section to resume the operating frequency control for bringing the detected output voltage to the desired voltage.

More preferably, the changeover frequency is higher than a second resonance frequency at which the gain of the LLC resonant circuit is 1 while the changeover switch is off.

Further, a required time between the suspension and the resumption of the operating frequency control for bringing the detected output voltage to the desired voltage needs to be shorter than at least a retention time during which an output of the LLC resonant converter can be maintained after supply of the input voltage has stopped.

When the input voltage rises during the operation with a low input voltage and low-frequency characteristics, the capacitance of the resonant capacitor is changed in order to shift to the operation with high-frequency characteristics. Even in this case, the LLC resonant converter having the above-described configurations can prevent breakdown of switches in the bridge circuit due to a shoot-through current or a surge voltage, and can avoid loss of control over the output voltage. In addition, the LLC resonant converter can suppress an inrush current because the difference between gains during the transition from low-frequency characteristics to high-frequency characteristics is smaller, which alleviates the stress on the switches in the bridge circuit. Eventually, the LLC resonant converter can achieve both a high-efficiency operation and a high gain, and thus can contribute to downsizing of a power unit or the like containing the LLC resonant converter.

Advantageous Effects of Invention

When the input voltage rises during the operation with a low input voltage and low-frequency characteristics, the capacitance of the resonant capacitor is changed in order to shift to the operation with high-frequency characteristics. Even in this case, the LLC resonant converter according to the present invention can prevent breakdown of switches in the bridge circuit due to a shoot-through current or a surge voltage, and can avoid loss of control over the output voltage. In addition, the LLC resonant converter can suppress an inrush current because the difference between gains during the transition from low-frequency characteristics to high-frequency characteristics is smaller, which alleviates the stress on the switches in the bridge circuit. Eventually, the LLC resonant converter can achieve both a high-efficiency operation and a high gain, and thus can contribute to downsizing of a power unit or the like containing the LLC resonant converter.

DESCRIPTION OF EMBODIMENTS

Figure 1:
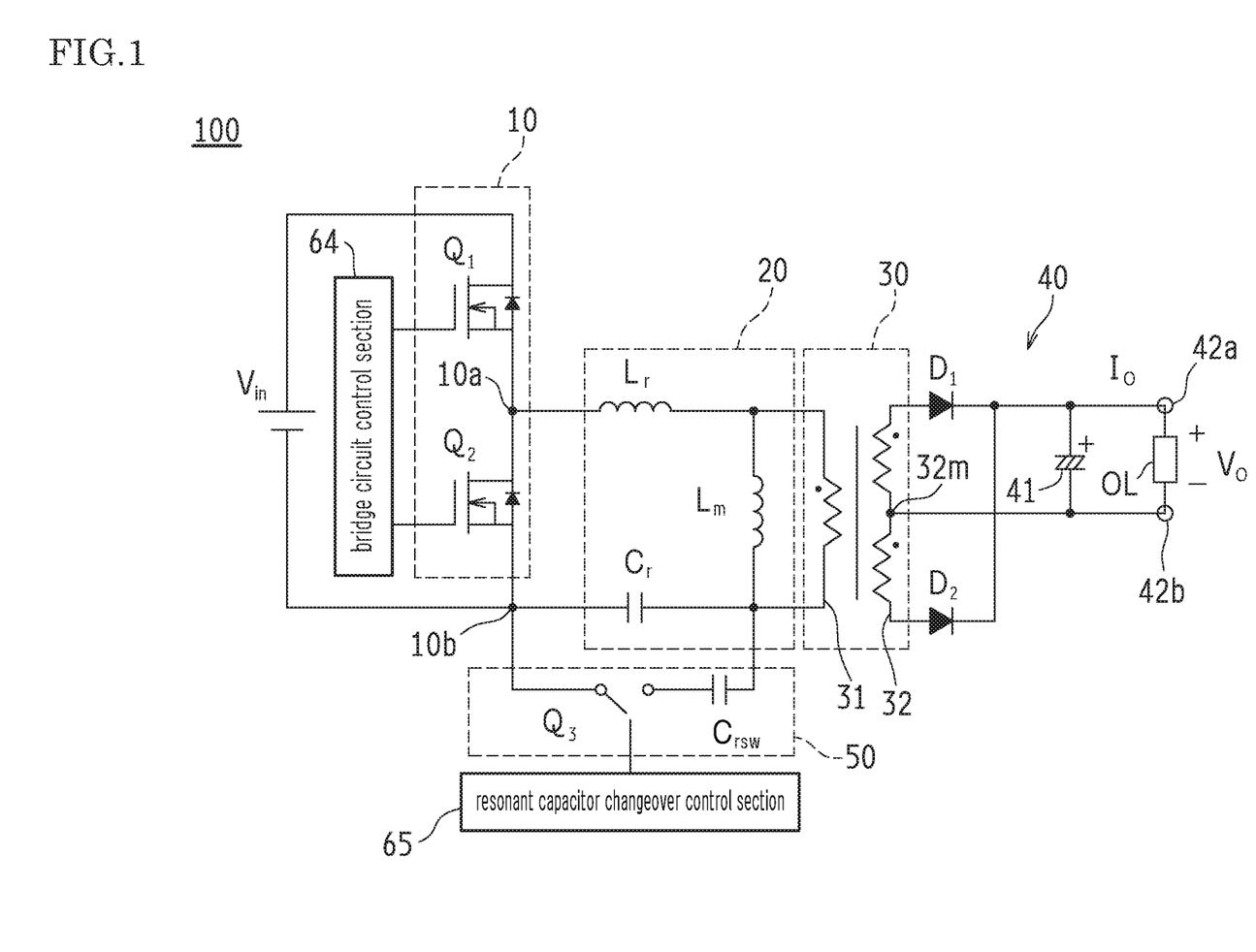
FIG. 1 is a circuit diagram showing a schematic configuration of a main part of an LLC resonant converter 100 in an embodiment according to the present invention.
Figure 2:
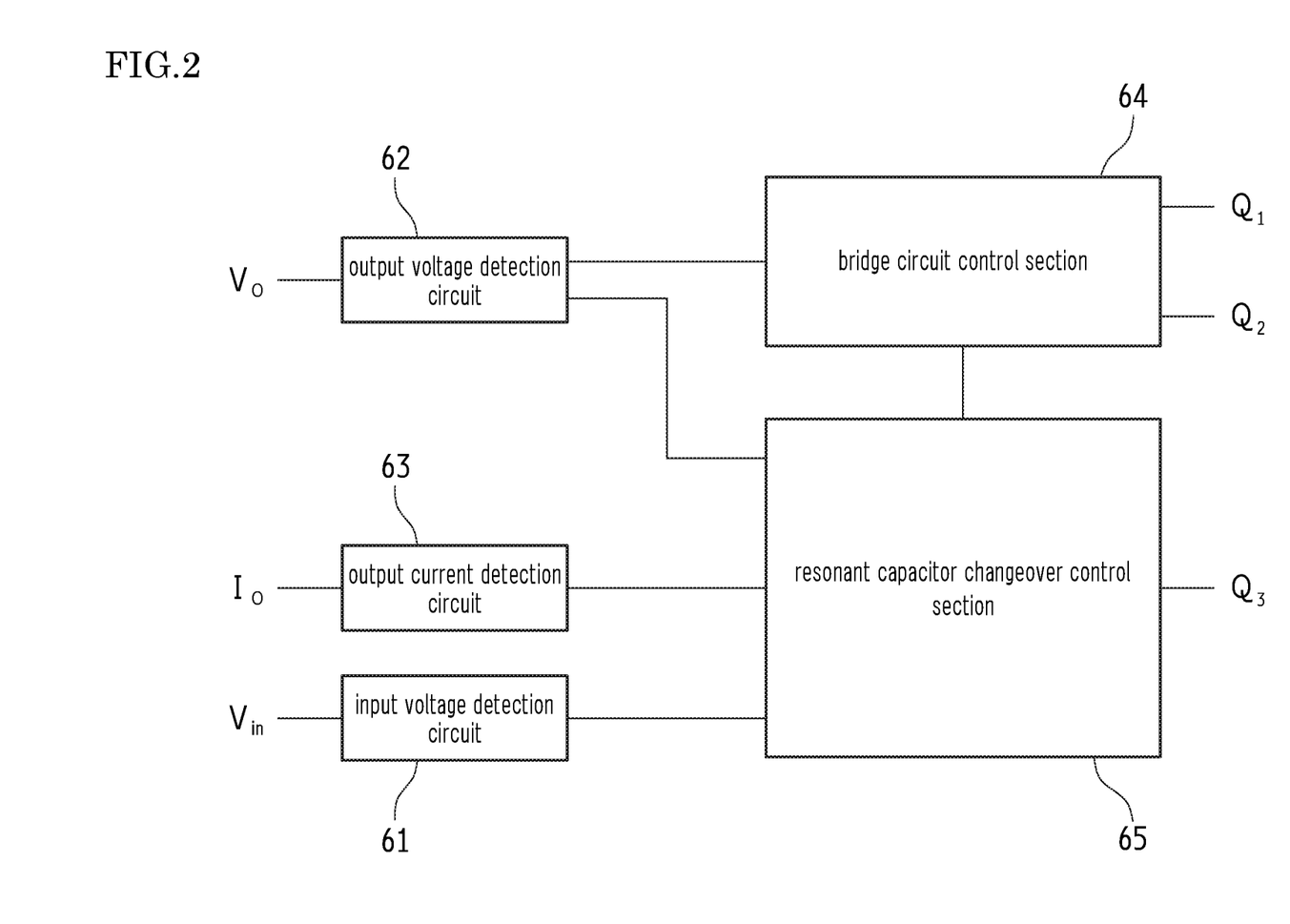
FIG. 2 is a block diagram showing a schematic configuration of a control section in the LLC resonant converter 100.

An embodiment according to the present invention is hereinafter described with reference to the drawings.
<Schematic Configuration in the Embodiment>
FIG. 1 is a circuit diagram showing a schematic configuration of a main part of an LLC resonant converter 100 in an embodiment according to the present invention. FIG. 2 is a block diagram showing a schematic configuration of a control section in the LLC resonant converter 100.

As shown in FIG. 1, the LLC resonant converter 100 includes a bridge circuit 10 configured to receive a DC input voltage Vin, an LLC resonant circuit 20 connected to the bridge circuit 10, a transformer 30 connected to the LLC resonant circuit 20, a rectifier circuit 40 connected to the transformer 30 and configured to send out a converted DC voltage, a resonant capacitor changeover circuit 50, a bridge circuit control section 64, and a resonant capacitor changeover control section 65.

The bridge circuit 10 has series-connected switches Q1, Q2. The states of these switches are changed in time sequence at an operating frequency f, under control of the bridge circuit control section 64. Namely, by such switching operations, the bridge circuit 10 sends out square-wave voltages at a connection point 10a between the switches Q1, Q2 and at a GND 10b.

The bridge circuit may be a half-bridge circuit as illustrated, or may be a full-bridge circuit instead. The switches Q1, Q2 may be, for example, but are not limited to, switching elements such as field effect transistors (FETs) and IGBTs.

The LLC resonant circuit 20 has a resonant capacitor Cr, an end of which is connected to the GND 10b of the bridge circuit 10. The resonant capacitor Cr, as well as a magnetizing inductance Lm and a leakage inductance Lr to be described later, forms the resonant circuit.

The transformer 30 includes a primary winding 31 and a secondary winding 32, which are isolated from each other. The transformer 30 is an ideal transformer, and forms an equivalent circuit of a real transformer in combination with the magnetizing inductance Lm connected in parallel to first and second ends of the primary winding 31 and the leakage inductance Lr connected in series to the first end of the primary winding 31. The first end of the primary winding 31 is connected to the connection point 10a of the switches Q1, Q2, via the leakage inductance Lr. The second end of the primary winding 31 is connected to the GND 10b of the bridge circuit 10, via the resonant capacitor Cr. The secondary winding 32 is provided with a center tap 32m. Similar to the LLC current resonant converter 1 shown in FIG. 5, the magnetizing inductance Lm and the leakage inductance Lr may be regarded as a part of the transformer 30.

The rectifier circuit 40 includes rectifier elements D1, D2 whose anodes (positive electrodes) are respectively connected to first and second ends of the secondary winding 32, a positive output terminal 42a connected to cathodes (negative electrodes) of the rectifier elements, a negative output terminal 42b connected to the center tap 32m of the secondary winding 32, a current smoothing capacitor 41 connected between the pair of output terminals 42a, 42b so as to smooth the electric current. Through this rectifier circuit, a DC output voltage Vo is generated at the pair of output terminals 42a, 42b. The rectifier circuit 40 is not limited to the center-tapped full-wave rectifier circuit, but may be a half-wave rectifier circuit, a bridge rectifier circuit, etc.

The resonant capacitor changeover circuit 50 includes a switch Q3 and a capacitor Crsw which are connected in series to each other and connected in parallel to the resonant capacitor Cr in the LLC resonant circuit 20. The switch Q3 turns on and off in response to a control signal from the resonant capacitor changeover control section 65.

Similar to the switches Q1, Q2, the switch Q3 may be, for example, but is not limited to, a switching element such as a field effect transistor (FET).

Turning to FIG. 2, the control section in the LLC resonant converter 100 includes not only the bridge circuit control section 64 and the resonant capacitor changeover control section 65, but also an input voltage detection circuit 61 for detecting an input voltage Vin (see FIG. 1), an output voltage detection circuit 62 for detecting an output voltage Vo (see FIG. 1), and an output current detection circuit 63 for detecting an output current Io (see FIG. 1) supplied to an output load OL (see FIG. 1).

The bridge circuit control section 64 is connected to the output voltage detection circuit 62. Based on the output voltage Vo detected by the output voltage detection circuit 62, the bridge circuit control section 64 controls the frequency (operating frequency f) of control signals sent to the switches Q1, Q2, and conducts pulse frequency modulation for the input voltage Vin.

The resonant capacitor changeover control section 65 is connected to the input voltage detection circuit 61, the output voltage detection circuit 62, and the output current detection circuit 63. The resonant capacitor changeover control section 65 sends an on/off control signal to the switch Q3, based on the input voltage Vin, the output voltage Vo, and the output current Io detected respectively by these circuits.

The resonant capacitor changeover control section 65 is also connected to the bridge circuit control section 64, and can send a command to the bridge circuit control section 64.

The bridge circuit control section 64 and the resonant capacitor changeover control section 65 may be configured as a single control section. Alternatively, the functions of these control sections may be performed, for example, by a control unit for an entire device containing the LLC resonant converter 100. As such, a proper program for performing such functions may be stored on a high-speed general-purpose CPU, etc.

Figure 3:
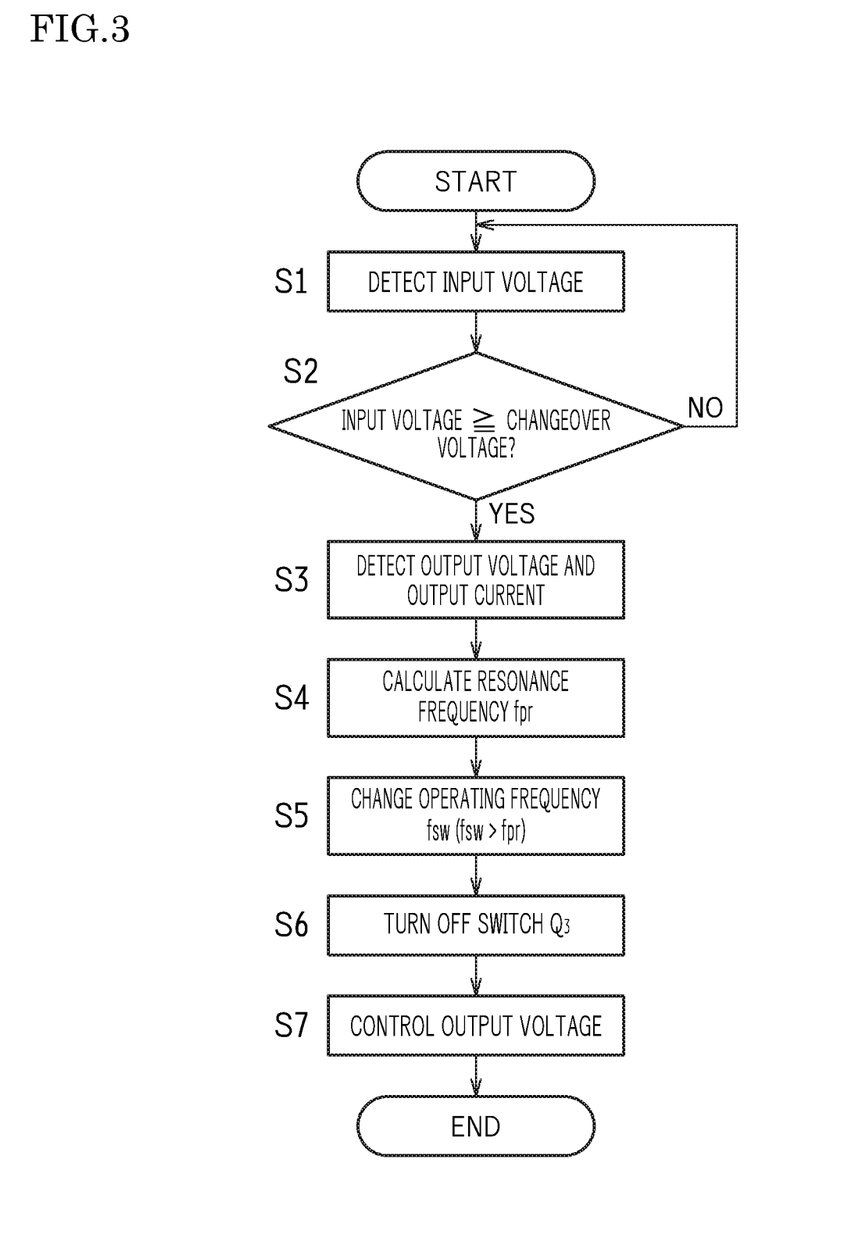
FIG. 3 is a flowchart that outlines changeover control at the control section in the LLC resonant converter 100, between the operation with the resonant capacitor Cr alone and the operation with the parallel-connected capacitors Cr and Crsw.
Figure 4:
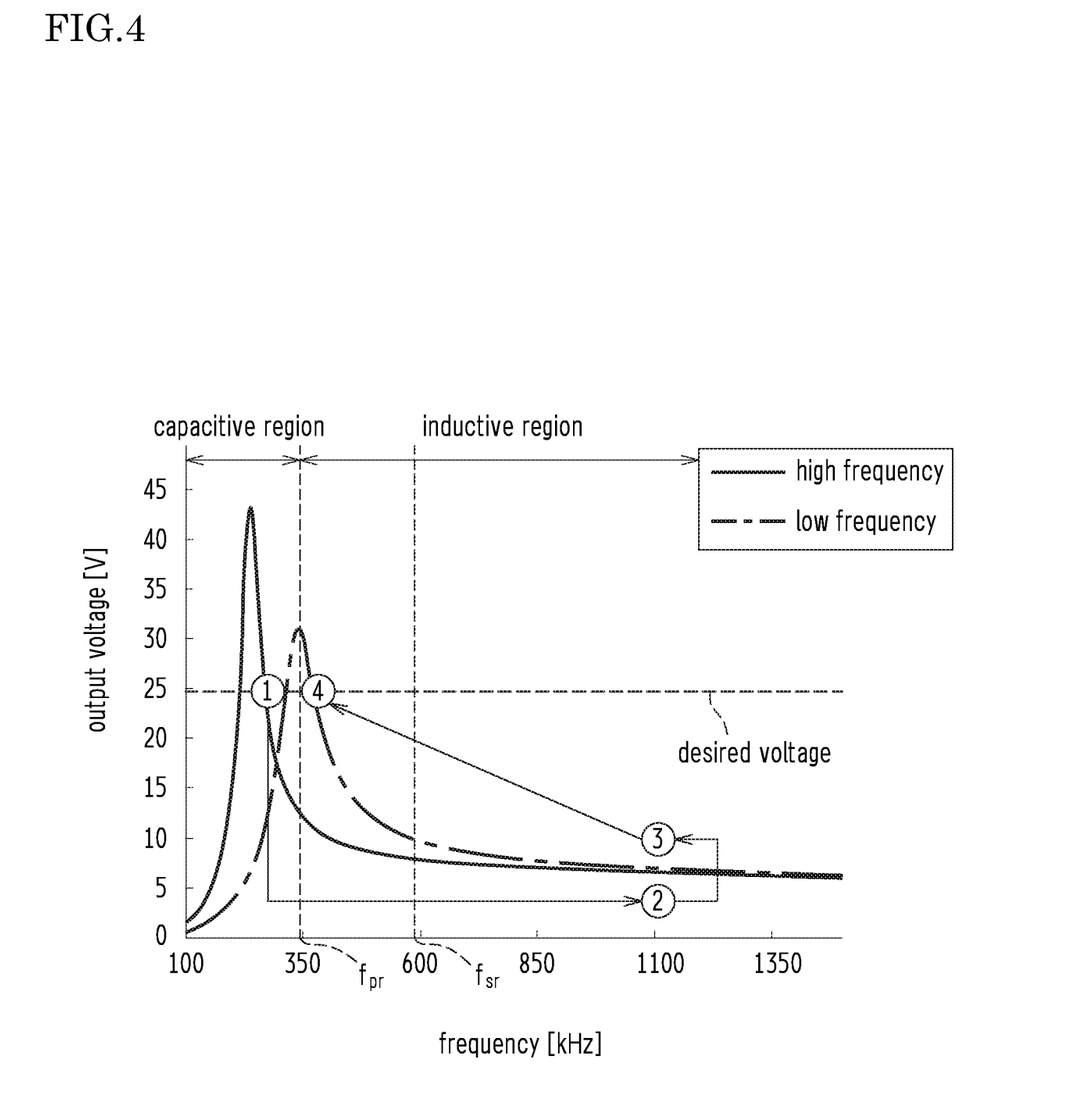
FIG. 4 is a graph describing an example of control in the LLC resonant converter 100, during the transition from low-frequency characteristics to high-frequency characteristics.

FIG. 3 is a flowchart that outlines changeover control at the control section in the LLC resonant converter 100, between the operation with the resonant capacitor Cr alone and the operation with the parallel-connected capacitors Cr and Crsw. FIG. 4 is a graph describing an example of control in the LLC resonant converter 100, during the transition from low-frequency characteristics to high-frequency characteristics.

If the input voltage Vin detected by the input voltage detection circuit 61 is lower than a predetermined changeover voltage, the resonant capacitor changeover control section 65 turns on the switch Q3 in order to increase the gain as much as possible. Once the switch Q3 is on, the LLC resonant converter 100 operates with low-frequency characteristics, with the capacitances of the resonant capacitor Cr and the capacitor Crsw.

In this state, as shown in FIG. 3, the resonant capacitor changeover control section 65 makes a comparison between the input voltage Vin detected by the input voltage detection circuit 61 (Step S1) and the changeover voltage, and determines which is greater (Step S2). The comparison may be repeated (No in Step S2).

When the resonant capacitor changeover control section 65 confirms that the input voltage Vin has increased and exceeded the changeover voltage (YES in Step S2, Point 1 in FIG. 4), the resonant capacitor changeover control section 65 calculates the resonance frequency fpr at which the gain is maximum (gain peak) while the switch Q3 is off (high-frequency characteristics) (Step S4), based on the output voltage Vo detected by the output voltage detection circuit 62 and the output current Io detected by the output current detection circuit 63 (Step S3).

Then, the resonant capacitor changeover control section 65 sends a command to the bridge circuit control section 64, to suspend the operating frequency control based on the detected output voltage Vo and to raise the operating frequency f instantly and sharply to the high frequency side, up to a changeover frequency that is higher than the resonance frequency fpr. Preferably, the resonant capacitor changeover control section 65 sends a command to raise the operating frequency f instantly and sharply to the high frequency side, over the resonance frequency fsr at which the gain is 1 while the switch Q3 is off (high-frequency characteristics) (Step S5, from Point 1 to Point 2 in FIG. 4).

Thereafter, the resonant capacitor changeover control section 65 turns off the switch Q3 (Step S6, from Point 2 to Point 3 in FIG. 4), and then sends a command to the bridge circuit control section 64 to resume the steady-state control of the operating frequency based on the detected output voltage Vo (Step S7). In response to this command, the LLC resonant converter 100 returns to the high-efficient operation with high-frequency characteristics, with the capacitance of the resonant capacitor Cr alone, so that the operating frequency f gradually drops to the low frequency side (from Point 3 to Point 4 in FIG. 4).

During the time between the suspension and the resumption of the operating frequency control based on the detected output voltage Vo in the bridge circuit control section 64, the gain decreases as the operating frequency f increases to the high-frequency side, so that the LLC resonant converter 100 cannot provide the desired output voltage Vo by itself. Hence, the required time between the suspension and the resumption of the operating frequency control based on the detected output voltage Vo is determined in consideration of the retention time t (see the description about FIG. 7) that is obtained, for example, by the capacitance of the block capacitor Cin connected to the input side of the bridge circuit 10. Specifically, the required time between the suspension and the resumption of the operating frequency control based on the detected output voltage Vo needs to be shorter than at least the retention time t.

The present invention can be embodied and practiced in other different forms without departing from the gist and essential characteristics of the present invention. Therefore, the above-described embodiment is considered in all respects as illustrative and not restrictive. The scope of the invention is indicated by the appended claims rather than by the foregoing description. All variations and modifications falling within the equivalency range of the appended claims are intended to be embraced therein.

The present application claims priority to Japanese Patent Application No. 2017-071185, filed Mar. 31, 2017. The contents of this application are incorporated herein by reference. The contents of the document cited in this application are also entirely and concretely incorporated herein by reference.

INDUSTRIAL APPLICABILITY

The present invention is suitably applicable not only to the switched-mode power supply as described above, but also to, for example, an inverter, wireless power transfer technology, etc.

REFERENCE SIGNS LIST

1 LLC current resonant converter
1A isolated DC/DC converter
1B equivalent circuit 1C equivalent circuit
1D LLC resonant converter
2 PFC
3 source circuit
10 bridge circuit
20 LLC resonant circuit
30 transformer
31 primary winding
32 secondary winding
40 rectifier circuit
41 current smoothing capacitor
50 resonant capacitor changeover circuit
61 input voltage detection circuit
62 output voltage detection circuit
63 output current detection circuit
64 bridge circuit control section
65 resonant capacitor changeover control section
100 LLC resonant converter
CP commercial power
Cr resonant capacitor (first capacitor)
Crsw capacitor (second capacitor)
D1 rectifier element
D2 rectifier element
f operating frequency
fpr resonance frequency (first resonance frequency)
fsr resonance frequency (second resonance frequency)
Io output current
Lm magnetizing inductance
Lr leakage inductance
OL output load
Q1 switch
Q2 switch
Q3 switch (changeover switch)
t retention time
Vin input voltage
Vo output voltage

The invention claimed is:

1. An LLC resonant converter comprising:
a bridge circuit configured to receive a DC input voltage and to send out a square-wave voltage by a switching operation of a switching element;
an LLC resonant circuit having at least a first capacitor and configured to resonate on receiving the square-wave voltage;
a transformer having a primary side connected to the LLC resonant circuit and a secondary side isolated from the primary side;
a rectifier element configured to convert an output from the secondary side of the transformer into a DC output voltage;
a smoothing capacitor configured to smooth the output voltage from the rectifier element;
a resonant capacitor changeover circuit having a changeover switch and a second capacitor that are connected in series to each other and connected in parallel to the first capacitor;
an input voltage detection circuit configured to detect the input voltage;
an output voltage detection circuit configured to detect the output voltage;
an output current detection circuit configured to detect an output current fed to a load;
a resonant capacitor changeover control section configured to control a state of the changeover switch in the resonant capacitor changeover circuit, based on at least one of the input voltage detected by the input voltage detection circuit, the output voltage detected by the output voltage detection circuit, and the output current detected by the output current detection circuit; and
a bridge circuit control section configured to control the switching operation of the switching element by pulse frequency modulation, and to control an operating frequency of the switching element such that the detected output voltage reaches a desired voltage or in response to a command from the resonant capacitor changeover control section,
wherein the resonant capacitor changeover control section is configured:
to turn on the changeover switch when the detected input voltage gets lower than a changeover voltage,
wherein the resonant capacitor changeover control section is configured:
when the detected input voltage exceeds the changeover voltage, to send a command to the bridge circuit control section to suspend control of the operating frequency for bringing the detected output voltage to the desired voltage and to raise the operating frequency to a changeover frequency;
then, to turn off the changeover switch; and
thereafter, to send a command to the bridge circuit control section to resume the operating frequency control for bringing the detected output voltage to the desired voltage,
wherein the changeover frequency is higher than a first resonance frequency at which a gain of the LLC resonant circuit is maximum while the changeover switch is off, the first resonance frequency being obtained from the detected output voltage and the detected output current, and
wherein a required time between the suspension and the resumption of the operating frequency control for bringing the detected output voltage to the desired voltage is shorter than at least a retention time during which an output of the LLC resonant converter can be maintained after supply of the input voltage has stopped.

2. The LLC resonant converter according to claim 1, wherein the changeover frequency is higher than a second resonance frequency at which the gain of the LLC resonant circuit is 1 while the changeover switch is off.

* * * * *